United States Patent
Monostori et al.

(10) Patent No.: US 7,753,394 B2
(45) Date of Patent: Jul. 13, 2010

(54) QUICK CHANGE VEHICLE TRAILER HITCH ADAPTER

(76) Inventors: Michael Monostori, 31 Riley Ave., Plattsburgh, NY (US) 12901; Tracy Monostori, 31 Riley Ave., Plattsburgh, NY (US) 12901

( * ) Notice: Subject to any disclaimer, the term of this patent is extended or adjusted under 35 U.S.C. 154(b) by 0 days.

(21) Appl. No.: 12/283,584

(22) Filed: Sep. 12, 2008

(65) Prior Publication Data
US 2009/0072517 A1    Mar. 19, 2009

Related U.S. Application Data

(60) Provisional application No. 60/993,921, filed on Sep. 14, 2007.

(51) Int. Cl.
*B60D 1/46* (2006.01)
(52) U.S. Cl. ................... 280/490.1; 280/495
(58) Field of Classification Search .......... 280/490.1, 280/495, 477
See application file for complete search history.

(56) References Cited

U.S. PATENT DOCUMENTS

| | | | | |
|---|---|---|---|---|
| 3,400,949 A | * | 9/1968 | Kendall | 280/490.1 |
| 3,692,330 A | * | 9/1972 | Kendall | 280/402 |
| 4,033,601 A | * | 7/1977 | Lindahl et al. | 280/490.1 |
| 4,157,189 A | * | 6/1979 | Poley | 280/490.1 |
| 4,373,847 A | * | 2/1983 | Hipp et al. | 414/401 |
| 4,429,895 A | | 2/1984 | Hunter | |
| 4,607,858 A | * | 8/1986 | Wagner | 280/491.5 |
| 4,645,227 A | * | 2/1987 | Callahan | 280/495 |
| 4,662,647 A | * | 5/1987 | Calvert | 280/490.1 |
| 5,138,780 A | * | 8/1992 | Kunkel | 40/765 |
| 5,358,269 A | * | 10/1994 | Jakeman et al. | 280/490.1 |
| 5,704,749 A | * | 1/1998 | Landgrebe | 411/366.2 |
| 5,927,742 A | | 7/1999 | Draper | |
| 6,575,488 B2 | * | 6/2003 | Massey | 280/490.1 |
| 6,612,603 B2 | | 9/2003 | Alger | |
| 6,908,094 B1 | * | 6/2005 | Sellers | 280/490.1 |
| 7,044,493 B1 | * | 5/2006 | Wilson | 280/489 |
| 7,118,053 B2 | * | 10/2006 | Truan et al. | 239/661 |
| 7,575,245 B2 | * | 8/2009 | Chuang | 280/301 |

* cited by examiner

*Primary Examiner*—Tony H. Winner
(74) *Attorney, Agent, or Firm*—James Ray & Assoc

(57) ABSTRACT

A trailer hitch apparatus for connecting a hitch coupling of a towed vehicle at adjustable heights to a hitch coupling of a towing vehicle includes an elongated member disposed on a predetermined portion of a rear end of such towing vehicle and extending in a vertical direction during use of the apparatus. Apertures are formed through the elongated member in a horizontal direction and are spaced apart in the vertical direction. The elongated member is secured in the vertical direction directly to such predetermined portion of such rear end. The hitch coupling of such towed vehicle is adjustably secured to the elongated member.

3 Claims, 1 Drawing Sheet

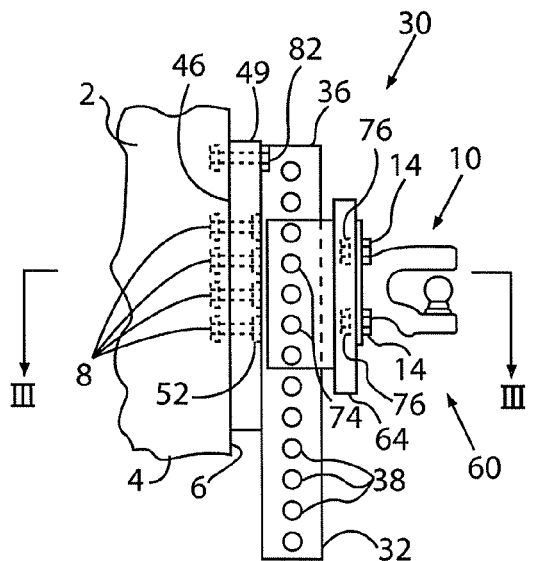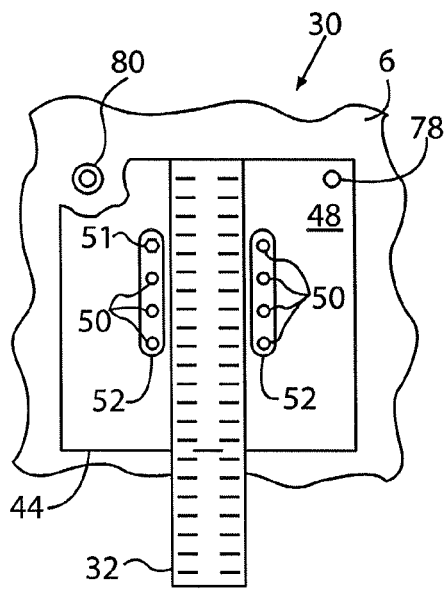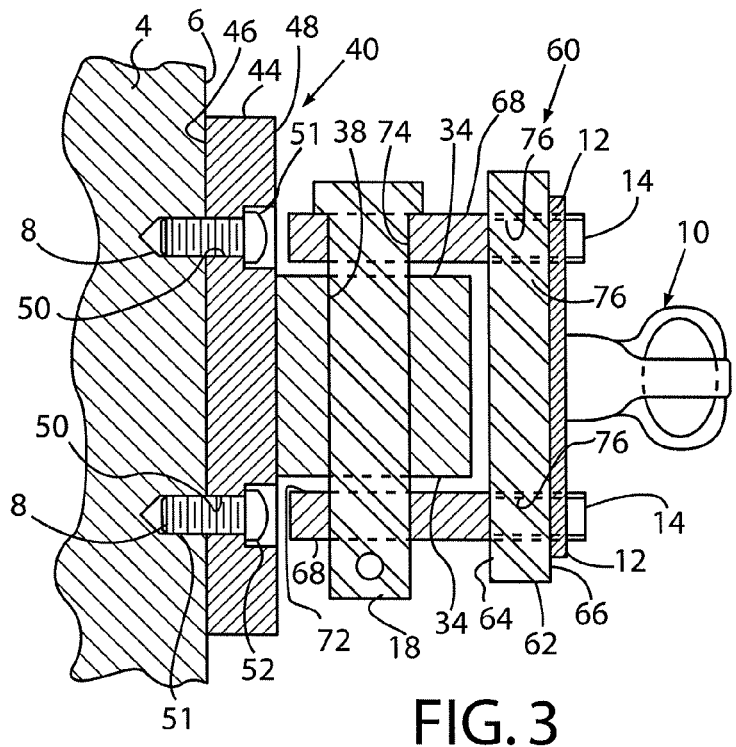

QUICK CHANGE VEHICLE TRAILER HITCH ADAPTER

CROSS-REFERENCE TO RELATED APPLICATIONS

This application is related to and claims priority from Provisional Patent Application Ser. No. 60/993,921 filed on Sep. 14, 2007.

FIELD OF THE INVENTION

The present invention relates, in general, to vehicle trailer hitch adapters and, more particularly, this invention relates to a vehicle trailer hitch adapter that allows vertical adjustment of the trailer hitch ball relative to the towing vehicle chassis and further allows connection of a hitch coupling of a towed vehicle at adjustable heights to a hitch coupling of a towing vehicle.

BACKGROUND OF THE INVENTION

As is generally well known, when a towed trailer is not level relative to a towing vehicle or road surface, the load carried by such towed trailer may not remain secure. This condition can cause the trailer to make wide-angled turns, and possibly, jackknife, if traveling at a high enough speed. Not only would this condition be dangerous to the driver towing the load, but for other drivers and pedestrians as well. The problem is especially felt by the owners and operators of medium-sized trucks that are tasked with frequent coupling and uncoupling of trailers in order to tow various loads and/or equipment to and from job sites.

Prior to the conception and design of the present invention, efforts have been made to alleviate difficulties in trailer leveling. U.S. Pat. No. 6,908,094 issued to Sellers, U.S. Pat. No. 6,663,113 issued to Rosenlund, U.S. Pat. No. 6,575,488 issued to Massey, U.S. Pat. No. 5,975,553 issued to Van Vleet, U.S. Pat. No. 5,511,813 issued to Kravitz, U.S. Pat. No. 4,662,647 issued to Clavert and U.S. Pat. No. 3,400,949 issued to Kendall disclose various hitch coupling devices for adjusting the vertical position of the trailer hitch ball. However, it has been found that such prior art devices have greater than desirable complexity and are thus characterized by a greater than desirable cost. Furthermore, it has been found necessary to improve resistance of such hitch coupling devices to lateral movements during use.

Therefore, there is a need for an improved trailer hitch apparatus for connecting a hitch coupling of a towed vehicle at adjustable heights to a hitch coupling of a towing vehicle.

SUMMARY OF THE INVENTION

In one aspect, the invention provides a trailer hitch apparatus for connecting a hitch coupling of a towed vehicle at adjustable heights to a hitch coupling of a towing vehicle. The apparatus includes an elongated member disposed on a predetermined portion of a rear end of such towing vehicle and extending in a vertical direction during use of the apparatus. Apertures are formed through the elongated member in a horizontal direction and are spaced apart in the vertical direction. There is means for securing the elongated member in the vertical direction directly to such predetermined portion of such rear end. There is also means for adjustably securing such hitch coupling of such towed vehicle to the elongated member, wherein such hitch coupling of such towed vehicle is releaseably fastened to the adjustably securing means.

In another aspect, the invention provides a trailer hitch apparatus for connecting a hitch coupling of a towed vehicle at adjustable heights to a hitch coupling of a towing vehicle. The apparatus includes a base member having a pair of opposed substantially planar surfaces. There is also an elongated member being one of secured to an opposed one of the pair of opposed substantially planar surfaces and formed integral with the base member. The elongated member extends in a substantially vertical direction during use of the apparatus. The elongated member has a top end thereof generally aligned with a top edge of the base member. Two elongated recesses are formed in the opposed one of the pair of opposed substantially planar surfaces substantially parallel to the elongated member. Each recess is disposed in close proximity to a respective side of the elongated member. First mounting apertures are formed through the base member in alignment with each elongated recess and are further aligned with threaded apertures provided in a portion of a rear structure of such towing vehicle. The first mounting apertures are sized for allowing passage of fasteners thereto to releaseably secure the base member in a substantially vertical plane to such portion of such rear structure of such towing vehicle. One of the pair of opposed substantially planar surfaces of the base member abuts such portion of such rear structure. A pair of spaced apart second mounting apertures is formed through the base member generally parallel and in close proximity to the top edge thereof. First height adjustment apertures are formed through the elongated member in a horizontal direction and are spaced apart in the vertical direction. There is a plate-like member that has a pair of opposed substantially planar surfaces. A pair of flanges being one of secured substantially perpendicular to one of the pair of opposed substantially planar surfaces of the plate-like member and formed integral therewith. Each of the pair of flanges extends in the vertical direction and is spaced from an opposed flange at a predetermined distance for slideably receiving the elongated member therebetween. At least a pair of second height adjustment apertures is provided. Each second height adjustment aperture is formed through a respective flange in alignment with one another, whereby the at least a pair of second height adjustment apertures is aligned with a selected one of the predetermined plurality of first height adjustment apertures for receiving a locking pin therethrough. Threaded mounting apertures are formed through the plate-like member for releaseably connecting, with threaded fasteners, such coupling of such towed vehicle to an opposed one of the pair of opposed substantially planar surfaces of the plate-like member.

OBJECTS OF THE INVENTION

It is, therefore, one of the primary objects of the present invention to provide an improved trailer hitch apparatus for connecting a hitch coupling of a towed vehicle at adjustable heights to a hitch coupling of a towing vehicle.

Another object of the present invention is to provide an improved trailer hitch apparatus that enables vertical adjustment of the towing vehicle hitch coupling.

Yet another object of the present invention is to provide an improved trailer hitch apparatus that has higher resistance to lateral forces present during use.

A further object of the present invention is to provide an improved trailer hitch apparatus that is economical to manufacture.

Yet a further object of the present invention is to provide an improved trailer hitch apparatus that is simple to install.

An additional object of the present invention is to provide an improved trailer hitch apparatus that is easily retrofittable onto vehicles presently in use.

Another object of the present invention is to provide an improved trailer hitch apparatus that is simple to use.

A further object of the present invention is to provide an improved trailer hitch apparatus that does not require use of special tools to install and use.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE DRAWINGS

FIG. 1 is a side elevation view of a hitch apparatus of the present invention for connecting a hitch coupling of a towed vehicle at adjustable heights to a hitch coupling of a towing vehicle;

FIG. 2 is a front elevation view of the apparatus of FIG. 1, with hitch coupling and its mounting member removed for clarity;

FIG. 3 is a cross-sectional view of the apparatus of the present invention along lines III-III of FIG. 1; and FIG. 4 illustrates an alternative attachment of the apparatus of the present invention to the towing vehicle.

BRIEF DESCRIPTION OF THE VARIOUS EMBODIMENTS OF THE INVENTION

Prior to proceeding to the more detailed description of the present invention, it should be noted that, for the sake of clarity and understanding, identical components which have identical functions have been identified with identical reference numerals throughout the several views illustrated in the drawing figures.

The best mode for carrying out the invention is presented in terms of its presently preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The present invention provides an improved trailer hitch apparatus 30 for connecting a hitch coupling of a towed vehicle at adjustable heights to a hitch coupling 10 of a towing vehicle 2. The present invention is illustrated and described in combination with medium-sized trucks employed in commercial applications for hauling small or medium-sized storage trailers, lawn care supplies, off-road vehicles and other pieces of heavy equipment. By way of examples only, such medium-sized trucks may be of the type manufactured under C4500 brand by General Motors Corporation of Detroit, Mich. However, it will be apparent to those skilled in the relevant art that the present invention may be applied to other vehicles, including passenger vehicles, and as such should not be interpreted as a limiting factor of the apparatus 30 of the present invention.

Reference is now made, to FIGS. 1-4, wherein there is shown a trailer hitch apparatus, generally designated as 30, for connecting a hitch coupling (not shown) of a towed vehicle (not shown) at adjustable heights to a hitch coupling 10 of a towing vehicle 2, which is partially illustrated in FIGS. 1-4. To help the reader in understanding structure and operation of the apparatus 30 of the present invention, hitch coupling 10 on medium-sized trucks 2 has four (4) through apertures 12 so that it can be attached with fasteners 14 to a rear portion of such towing vehicle 2. On medium-sized trucks 2, such rear portion is generally a substantially planar rear frame surface 6 of the truck frame 4. Furthermore, the rear frame surface 6 has four (4) pairs of vertically spaced threaded apertures or bores 8 that receive threaded portions of the fasteners 14. Thus, the hitch coupling 10 is attachable in two positions conventionally known as high and low positions.

The apparatus 30 includes an elongated member 32 that extends in a vertical direction during use. The elongated member 32 has each of a predetermined length and a predetermined cross-section and is formed from a predetermined material. The presently preferred material is metal and, more particularly, steel, although other materials capable of withstanding the towing rigors are also within the scope of the present invention. The presently preferred elongated member 32 has a pair of generally planar side surfaces 34, and preferably, all side surfaces of the elongated member 32 are substantially planar. The presently preferred cross-section of the elongated member 32 is a solid square to meet the towing rigors, although use of the hollow elongated member 32 is also contemplated in the present invention. The presently preferred length of the elongated member 32 is about nineteen (19) inches providing for proper ground clearance and adjustment range when installed on such medium-sized trucks 2.

The apparatus 30 further includes a predetermined plurality of apertures 38 formed through the elongated member 32 in a horizontal direction and spaced apart in a vertical direction when the elongated member 32 is secured to the vehicle 2. It has been found that spacing apertures 38 at about one and one quarter (1.25) of an inch from each other optimizes number of adjustment positions and maintains structural integrity of the elongated member 32.

There is means, generally designated as 40, for securing the elongated member 32 to such rear frame surface 6 of the truck frame 4. Such securing means 40 may be at least one and, preferably a pair of welds 42, best shown in FIG. 4. Alternatively, such securing means provide for the elongated member 32 being formed integral with the rear frame surface 6 of the truck frame 4 which may be advantageous for new vehicles. In the presently referred embodiment of the invention, the securing means 40 provides for releasable attachment of the elongated member 32 and includes a plate-like base member 44 having a pair of opposed substantially planar surfaces 46 and 48. The base member 44 is positioned generally vertical with one of such pair of substantially planar surfaces 46 and 48, referenced as 46 in FIGS. 1 and 3, abutting the rear frame surface 6 of truck frame 4. The elongated member 32 is disposed on an opposed surface 48 and is rigidly secured to the base member 44. The elongated member 32 may be secured in any one of the conventional methods including but not limited to welding, machining, casting, molding or forging process. Thus, the present invention also contemplates that the elongated member 32 may be provided integral with the base member 44. Furthermore, it is within the scope of the present invention to provide the base member 44 as a pair of flanges, each affixed to and extending outwardly form a respective side of the elongated member 32 and further forming a generally planar surface therewith, particularly, when the elongated member 32 and the base member 44 are provided integral with each other. The top end 36 of the elongated member 32 may be aligned flush with a top edge 49 of the base member 44, as best shown in FIGS. 1-2.

The presently preferred securing means 40 further includes a predetermined plurality of apertures 50 formed through the base member 44 and aligned with mounting apertures 8 provided within the rear frame surface 6 of truck frame 4. The apertures 50 are sized for allowing passage of operative portions of fasteners 51 thereto in order to releaseably secure the base member 44 in a substantially vertical plane to the rear frame surface 6 of truck frame 4. Such fasteners 51 may be the original fasteners 14 securing the hitch coupling 10 or substantially equivalent thereto. For the sake of clarity, only one (1) fastener 51 is shown in FIG. 2 and two (2) fasteners 51 are shown in FIG. 3. Thus, the apparatus 30 of the present invention provides for ease of attaching the elongated member 32 to the rear frame surface 6 of truck frame 4 without the use of special tools.

The securing means 40 additionally includes a pair of elongated recesses 52 formed in the opposed one of the pair of opposed substantially planar surfaces of the base member 44. Each of the pair of elongated recesses 52 is disposed substantially parallel and in close proximity to the elongated member 32. The apertures 50 are then formed through the base member 44 in alignment with a respective elongated recess 52 so that the end surfaces of the heads of the fasteners 51 are disposed flush or below the surface 48 and do not protrude above it.

The apparatus 30 also includes means, generally designated as 60, for releaseably and adjustably securing the hitch coupling 10 to the elongated member 32. In accordance with a presently preferred embodiment of the invention, such securing means 60 includes a plate-like member 62 having a pair of opposed substantially planar surfaces 64 and 66. Two (2) flanges 68 are disposed substantially perpendicular to one of the pair of opposed substantially planar surfaces of the plate-like member 62, referenced as 64 and best shown in FIG. 3. Flanges 68 extend in the vertical direction during use and are spaced from each other at a predetermined distance for slideably receiving the elongated member 32 therebetween. Preferably, at least the inner surface 72 of each flange 62 is substantially planar for cooperating with the substantially planar side surfaces 34 of the elongated member 32. The flanges 68 may be secured to or formed integral with the plate-like member 62. The inner surface 72 may abut a respective side surface 34 or a predetermined clearance may be formed therebetween as best shown in FIG. 3.

At least a pair of apertures 74 is provided, with each aperture 74 formed through a respective flange 68 in alignment with one another. It is presently preferred to provide two (2) vertically spaced apertures 74 in each flange 68 to enhance alignment and vertical stability of the hitch coupling 10. To secure the hitch coupling 10 of the towing vehicle 2 to the plate-like member 62, plurality of threaded apertures or bores 76 are formed in the plate-like member 62 in alignment with the apertures 12 of the hitch coupling 10.

In use, the elongated member 32 of the presently preferred embodiment is first secured to the rear frame surface 6 of truck frame 4. To achieve this, the original hitch coupling 10 (if provided with the truck 2) is removed from the rear frame surface 6 of the truck frame 4 by first removing the fasteners 14. Then, the original hitch coupling 10 is secured with fasteners 14 to the surface 66 of the plate-like member 62. The elongated member 32 is secured, preferably with fasteners 51 to the rear frame surface 6 of truck frame 4. Next, the plate-like member 62 is positioned so that the elongated member 32 is received between the flanges 68. The apertures 74 are aligned with apertures 38. Advantageously, use of elongated recesses 52 enables positioning of the outer edges of the flanges 68 in close proximity to the surface 48 of the base member 44 thus reducing the cost and size of the apparatus 30. Conventional locking pin or pins 18, best shown in FIG. 3, are inserted through aligned apertures 74 and 38. It would be appreciated that the user may elect to first couple the hitch coupling of the towed vehicle (not shown) with the hitch coupling 10 prior to inserting the locking pin or pins 18 in order to select the desired height of such coupling arrangement. Or the user may elect to adjust the height after the coupling. When the user needs to adjust the position of the hitch coupling 10, the user removes the locking pin or pins 18, repositions the plate like member 62 in a generally sliding motion and in a vertical direction to accommodate specific types of the towed trailer or vehicle (not shown).

The present invention also provides means for enhancing lateral stability of the apparatus 30 when the towed trailer or vehicle (not shown) is being backed into a storage or parking position. It is well known that in these conditions the longitudinal axis of such towed trailer or vehicle (not shown) often disposed at an angle to the longitudinal axis of the towing vehicle 2 thus resulting in higher lateral forces being exerted onto the coupling arrangement and, particularly onto the attachment of the elongated member 32 to the rear frame surface 6 of the truck frame 4. Accordingly, a pair of apertures 78 is formed through the base member 44 generally parallel and preferably in close proximity to the top edge 49 thereof. Each aperture 78 is also preferably positioned in close proximity to a respective top corner of the plate like member 44 in order to increase spacing therebetween. Complimentary threaded apertures or bores 80, only one of which is shown in FIG. 2, are then provided in the rear frame surface 6 of the truck frame 4 and a pair of fasteners 82 is used to additionally secure the base member 44 to the rear frame surface 6 of the truck frame 4. Thus, the apparatus 30 provides for increased resistance of the elongated member 32 to lateral forces present during use of the apparatus 30 of the present invention.

Although the present invention has been shown in terms of the use of the apparatus 30 on medium-size trucks having the hitch coupling secured to the rear surface 6 of the frame 4, it will be apparent to those skilled in the art, that the present invention may be applied to other vehicles. For example, the elongated member 32 can be secured in a vertical direction to the conventional hitch socket of the conventional passenger vehicle by adopting the elongated member 32 with an attachment member forming an L-shape or T-shape of such elongated member 32.

It is also within the scope of the present invention to form the hitch coupling 10 integral with the plate-like member 62 which may be advantageous to reduce manufacturing and installation costs. It would be appreciated that the mounting flange of the hitch coupling 10 will essentially replace the plate-like member 62. Same configuration can be achieved by adapting the mounting plate of the hitch coupling 10 with a pair of outwardly extending and spaced-apart flanges 68.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. In combination with at least one of a towing and towed vehicle, an apparatus for connecting a hitch coupling of said towed vehicle at adjustable heights to a hitch coupling of said towing vehicle, said apparatus comprising:

(a) a base member having a pair of opposed substantially planar surfaces;

(b) an elongated member being one of secured to one of said pair of opposed substantially planar surfaces of said base member and formed integral therewith, said elongated member extending in a substantially vertical direction during use of said apparatus, said elongated member having a top end thereof generally aligned with a top edge of said base member;

(c) a pair of elongated recesses formed in said opposed one of said pair of opposed substantially planar surfaces substantially parallel to said elongated member, each of said pair of elongated recesses disposed in close proximity to a respective side of said elongated member;

(d) a predetermined plurality of first mounting apertures formed through said base member in alignment with a respective one of said pair of elongated recesses and in further alignment with threaded apertures provided in a portion of a rear structure of said towing vehicle, said first mounting apertures sized for allowing passage of fasteners thereto to releaseably secure said base member in a substantially vertical plane to said portion of said rear structure of said towing vehicle, wherein one of said pair of opposed substantially planar surfaces of said base member abuts said portion of said rear structure;

(e) a pair of spaced apart second mounting apertures formed through said base member generally parallel and in close proximity to said top edge thereof;

(f) a predetermined plurality of first height adjustment apertures formed through said elongated member in a horizontal direction and spaced apart in said vertical direction;

(g) a hitch coupling member having a pair of opposed substantially planar surfaces;

(h) a pair of flanges being one of secured substantially perpendicular to one of said pair of opposed substantially planar surfaces of said hitch coupling member and formed integral therewith, each of said pair of flanges extending in said vertical direction and spaced from each other at a predetermined distance for slideably receiving said elongated member therebetween;

(i) at least a pair of second height adjustment apertures, each of said at least a pair of second apertures formed through a respective flange in alignment with one another, whereby said at least a pair of second height adjustment apertures is aligned with a selected one of said predetermined plurality of first height adjustment apertures for receiving a locking pin therethrough; and (j) a predetermined plurality of threaded mounting apertures formed through said hitch coupling member for releaseably connecting, with threaded fasteners, said hitch coupling of said towed vehicle to an opposed one of said pair of opposed substantially planar surfaces of said hitch coupling member.

2. The apparatus, according to claim 1, wherein outer edges of said flanges are positioned in close proximity and spaced from said opposed one of said pair of opposed substantially planar surfaces of said base member during use.

3. The apparatus, according to claim 1, wherein said apparatus includes a predetermined clearance formed between inner surfaces of each flange and a respective side surface of said elongated member.

* * * * *